May 23, 1939.　　　　H. A. WHEELER　　　　2,159,240
TUNING INDICATOR
Filed June 22, 1932　　　2 Sheets-Sheet 1
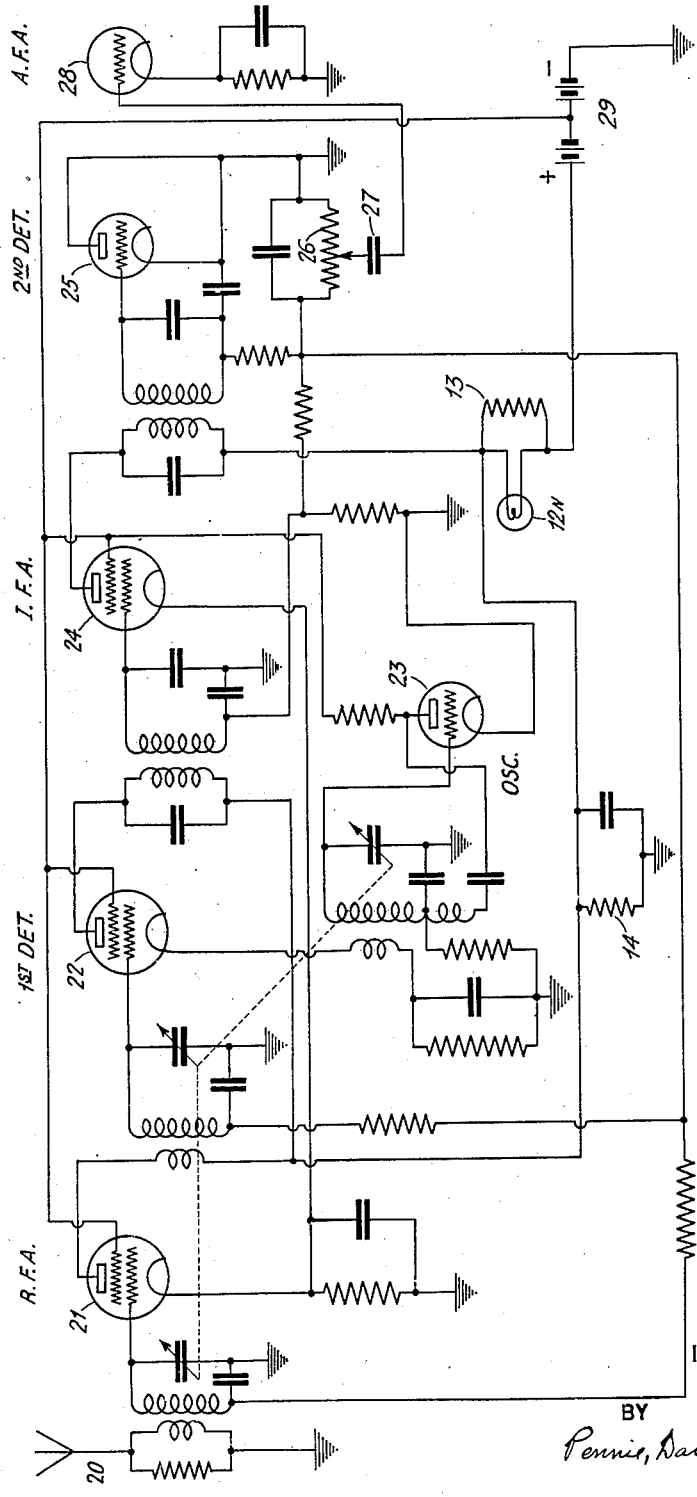
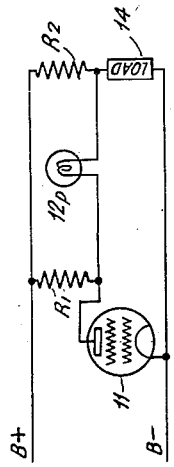
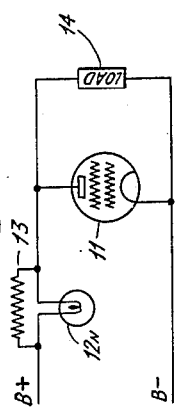
INVENTOR
HAROLD A. WHEELER
BY
Pennie, Davis, Marvin and Edmonds
ATTORNEYS May 23, 1939.  H. A. WHEELER  2,159,240
TUNING INDICATOR
Filed June 22, 1932  2 Sheets-Sheet 2
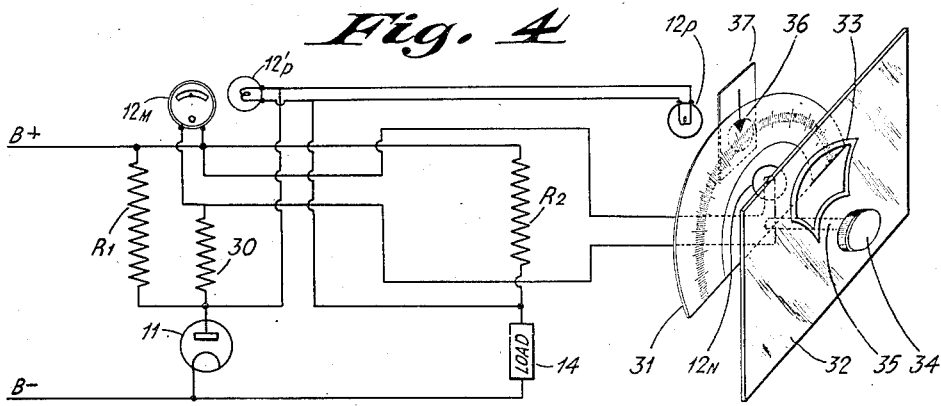
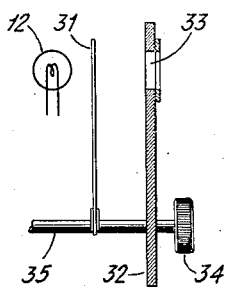
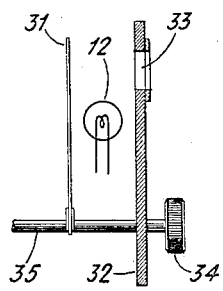
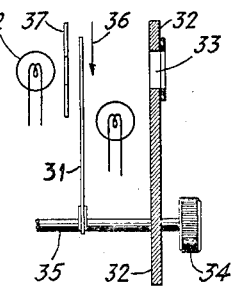
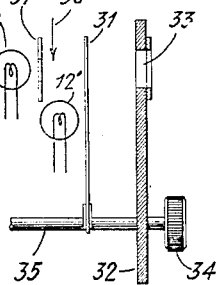
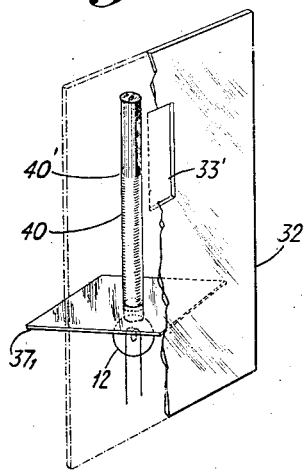
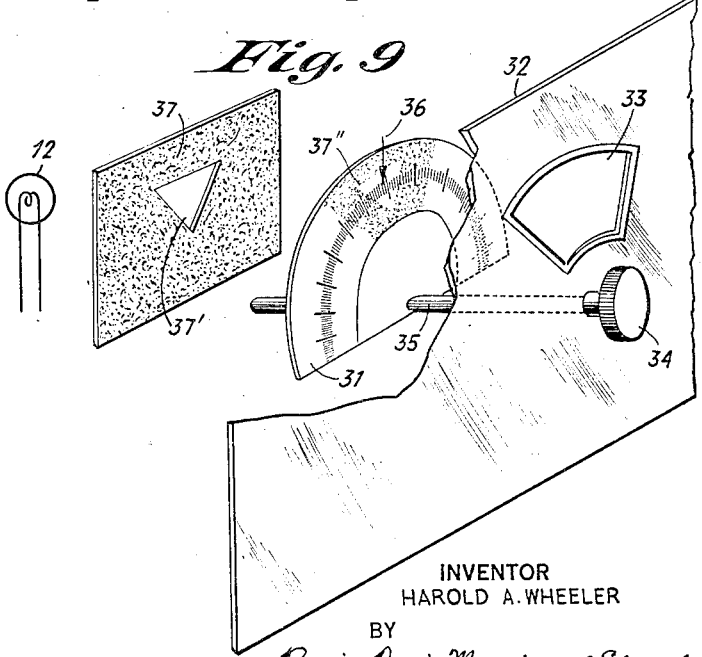
INVENTOR
HAROLD A. WHEELER
BY
Pennie, Davis, Marvin and Edmonds
ATTORNEYS Patented May 23, 1939

2,159,240

UNITED STATES PATENT OFFICE 2,159,240

TUNING INDICATOR

Harold A. Wheeler, Great Neck, N. Y., assignor to Hazeltine Corporation

Application June 22, 1932, Serial No. 618,605

21 Claims. (Cl. 250—20)

This invention relates to radio receivers, and more particularly to visual means for indicating when a receiver is tuned to resonance with the signal being received.

For indicating the point of resonance, there is provided an incandescent lamp connected in the circuit of the receiver in such a manner that a distinct change in the brilliance of the illumination caused thereby is produced whenever the receiver is tuned to resonance. Means are also provided, in accordance with the method disclosed in U. S. Patent No. 1,522,305 to Marius Latour, for maintaining the filament of the indicator lamp at all times, when not incandescent, in a state of incipient incandescence. By this is meant that the current through the filament is sufficient to keep it at such a temperature that small changes in filament current produce large changes in effective illumination.

With the present-day receiving arrangements it is often difficult to determine when the receiver is tuned exactly to the frequency of the signal being received. This is particularly true with receivers of the so-called "automatic volume control" type, due to the fact that as the receiver is being tuned through a considerable frequency range, the automatic amplification control will cause a signal of nearly uniform intensity to be reproduced, thus making tuning by maximum audible signal response impracticable. Reception, while the receiver is not tuned exactly to the frequency of the desired signal, results in audio-frequency distortion.

It is the primary object of this invention to provide a method of and means for producing a visual indication of the point of resonance of a radio receiver.

Due to the fact that the changes in current produced within a receiver as it is tuned through the point of resonance are relatively small, it is quite difficult to produce sufficient current change to give a visual indication with a lamp used as a tuning indicator. It is therefore an additional object of this invention to provide a method of and means for producing a visible change in the illumination of an incandescent lamp by small changes in current as brought about by tuning.

These and further objects of the invention will become apparent from the following description taken in connection with the accompanying drawings.

In accordance with one feature of the present invention, there is provided a radio receiver comprising a plurality of light sources. Means controlled by an incoming signal, which means may comprise automatic amplification control means, are provided for differentially so energizing the light sources that as the intensity of illumination of one source is increased to give what may be termed a "positive" indication that from the other source is diminished to give a negative indication. A tuning indicating device may be arranged to be illuminated by one or both of the light sources.

In accordance with another feature of the invention, the receiver is of the automatic amplification control type and comprises a signal-selecting means tunable to receive any signal of a specified frequency in a band of frequencies together with means for amplifying the received signals. An incandescent indicating means is coupled to the amplifying means for producing variations in illumination in accordance with the average current flowing through the amplifying means. In order to render readily perceptible small variations in light produced by the indicating means, any suitable light-diffusing means may be associated with the indicating means, such as a light-diffusing screen in which the area of apparent illumination varies with the intensity of illumination, thus providing an indication of small variations in the tuning of the signal-selecting means. The indicating means may be maintained at incipient incandescence for minimum value of current through the amplifying means so that small variations in such current result in relatively larger variations in illumination. This system also may comprise two light-producing indicating means coupled to the amplifying means whereby variations in the amplification therein produce direct and inverse variations in the illumination of the two indicating means. The light-diffusing means may comprise a tuning dial operatively related to the tunable signal-selecting means and differentially illuminated by the light-producing indicating means so that the apparent change in illumination is doubled. By so varying the illumination of the indicating means in accordance with the amplification in said amplifier, the apparent ratio of differently illuminated areas of the screen is varied continuously to indicate continuous variations in tuning of said receiver.

In accordance with still another feature of the invention, the indicating device comprises an elongated column of translucent material, for example, translucent light-diffusing glass, and means for illuminating an end surface of the column, the column comprising means the visibility of which is dependent upon the intensity of illumination. The illuminating means may be a source of illumination of variable intensity disposed adjacent one end of the column whereby the apparent illumination of the column is dependent upon the illumination intensity.

Having thus briefly described the invention, attention is invited to the drawings, in which:

Fig. 1 is an elementary circuit showing the connections of a tuning lamp for indicating resonance by a decrease of illumination, i. e., negative indication;

Fig. 2 is an elementary circuit showing the connections of a tuning lamp for indicating resonance by an increase of illumination, i. e., positive indication;

Fig. 3 is a diagram of the high-frequency portion of a superheterodyne radio receiver of the automatic volume control type including a tuning lamp for giving a negative indication as the set is tuned to resonance;

Fig. 4 is an elementary diagram illustrating a circuit employing indicating lamps giving both positive and negative indications, and showng a tuning dial arrangement sutable for use with such circuit;

Figs. 5 to 9, inclusive, are various arrangements of tuning dials and indicator lamps;

Fig. 10 is a schematic projection of a thermometer type of indicator arrangement.

The circuit of Fig. 1 illustrates, schematically, an arrangement for producing a negative indication of the point of resonance. In this circuit the tube 11 represents the radio-frequency amplifier tubes of a radio receiver, or the radio-frequency amplifier tubes which are controlled by the automatic volume control. The grid circuits and other usual connections have been omitted. The indicator lamp 12$_N$ is included in the plate-potential supply lead and is shunted by the resistor 13. A load 14 is arranged in parallel with the load imposed by the amplifier tubes 11. The indicating lamp 12$_N$ should preferably have a reasonably low resistance filament, in order to prevent too great a reduction in the plate voltage of the tube 11. A lamp which has been found suitable for this purpose is a small carbon-filament incandescent lamp rated at 24 volts, 24 milliamperes, 1000 ohms. However, any suitable lamp may be used, the specific details of which constitute no essential part of this invention.

When the invention is included in a receiver having automatic volume control in which the tubes 11 are the tubes controlled by the automatic volume control, the average plate current drawn by the controlled tubes of the amplifier, which determines the light produced by the incandescent indicator lamps, decreases as the signal intensity increases, and therefore, when the receiver is tuned to resonance, the plate current drawn by these tubes will be minimum. It therefore follows that the current through the indicating lamp will be minimum at this time. Hence, as the tuning of the receiver approaches resonance, there is observed an inverse variation of light with respect to the response to the signal, which inverse variation is a negative indication of the accuracy of tuning. The load 14 is adjusted so that under these conditions, when tuned to a signal of average intensity, the current through the lamp 12 will be sufficient to cause incipient incandescence. When, however, the receiver is tuned off the point of resonance, the current through the tubes 11 will increase, producing an increase in the current through the lamp 12$_N$ and causing its filament to become incandescent. The circuit constants are so chosen that small variations in the tuning will be clearly indicated by the change in the light produced by lamp 12$_N$, although the variation in tuning is insufficient to produce a change in sound which is perceptible to the ear. The resistor 13 is included in the circuit in shunt with the lamp 12$_N$ for the purpose of preventing an interruption of the plate supply to the tubes 11 in the event that the indicating lamp 12$_N$ should burn out.

A tungsten filament lamp may be substituted for the resistor 13, and the illumination produced by said lamp may be utilized to give a general illumination to the tuning dial of the receiver, as will be explained hereinafter. The tungsten lamp is a "constant current" device and therefore intensifies the percentage current change in the carbon-filament tuning-indicator lamp, as the latter has an approximately constant resistance.

In Fig. 2, which shows a schematic circuit for giving a positive indication of resonance, the lamp 12$_P$ is included in a bridge circuit, one pair of arms of which includes the resistance R$_1$, and the impedance of the tubes 11, which latter represents the radio-frequency amplifier, or the controlled tubes of a radio receiver. The other pair of arms comprises the resistance R$_2$ and the load 14. The load 14 may in this instance be the plate load imposed by the audio-frequency and output tubes of the radio receiver. The lamp 12$_P$ may be similar to that described in connection with Fig. 1, although, in general, any other indicating lamp having a low resistance could be utilized.

Since the plate current drawn by the controlled tubes 11 decreases as the receiver is tuned to resonance, the voltage drop across the resistor R$_1$ will decrease, which will give a consequent rise in the voltage impressed upon the indicating lamp 12$_P$. This will cause the illumination of the lamp 12$_P$ to increase, giving a positive indication of resonance. It therefore follows that the light produced by the indicating lamp 12$_P$ will vary inversely with the amount of amplification in the signal amplifier and directly with the received signal intensity.

In this bridge arrangement the values of the resistances R$_1$ and R$_2$ and the value of the load 14 are properly chosen depending upon the variation in the load of the controlled tubes and the resistance of the lamp 12$_P$. However, in general, the resistances R$_1$ and R$_2$ are of the same order of magnitude and should both be large in comparison with the lamp resistance. By means of the lamp 12$_P$, there are produced perceptible, positive, visual indications of small variations in the tuning of the signal-selecting means.

Either of the circuits just described for giving positive or negative indications of resonance may be employed in connection with the tuning indicating lamps to be described hereinafter.

In Fig. 3 a superheterodyne radio receiver of the automatic volume control type is shown in connection with a tuning indicator lamp arranged to give a negative indication. In this circuit the antenna circuit 20 is coupled to the signal-selecting means comprising the tunable input of the radio-frequency amplifier tube 21, and the tunable input of the detector tube 22. The incoming signals are amplified by the tube 21 and impressed upon the input of the detector 22. An oscillation-frequency current differing from the received signal by a fixed amount is produced by the oscillator tube 23 and its associated circuits and is impressed upon the input of the tube 22. The modulated output of the tube 22 is amplified by signal amplifying means comprising the intermediate-frequency amplifier 24, the input of which is connected or otherwise coupled to the selecting means, and the output of the amplifier 24 is impressed upon the input of the diode detector 25. Included in the detector circuit is a resistor 26. A selected portion of the voltage built up across resistor 26 is impressed through the condenser 27 upon the input of the audio-frequency amplifier tube 28, by which it is amplified and reproduced by means of appropriate output amplifiers and a loud speaker (not shown).

Amplification control means, which will now be described, are provided for automatically controlling the amplification of the amplifier means inversely in accordance with the received signal intensity. The grid returns of the radio-frequency amplifier tube 21, the first detector 22, and the intermediate-frequency amplifier tube 24 are each connected to the low voltage end of the resistor 26, by means of which the bias on these tubes is regulated in accordance with the average signal strength. These tubes are each provided with an initial bias to permit them to give maximum amplification, and as the average signal strength impressed upon the detector increases, the bias on these tubes is reduced so that their amplification is cut down, thus automatically controlling the output volume. This circuit arrangement is well known and need not be further described.

The plate-voltage supply connection of the controlled tubes 21, 22 and 24 includes the indicating lamp 12N, shunted by the resistor 13, and the high-potential source 29. The shunt load 14 is connected between the low voltage end of the lamp 12N and ground. This is the same arrangement as has been shown in Fig. 1, and the operation thereof is the same. As the tuning condensers of the input circuits of the radio-frequency amplifier 21, the oscillator circuit, and the input circuit of the first detector 22 are simultaneously tuned to reproduce a given signal, the average voltage existing across the resistor 26 will increase, causing a reduction in the plate current passing through the controlled tubes. This will result in a decrease in the current passing through the indicator lamp 12N and give a negative indication of resonance.

Similarly, the circuit shown in Fig. 2 may be incorporated into a radio receiver of the same type as that just described. In this event, however, the load 14 may comprise the voltage drop through the audio-frequency amplifier tubes, including the amplifier 28.

The circuit of Fig. 4 shows an indicating lamp 12N connected in series with the controlled amplifier tube 11, and a second indicating lamp 12P connected in a bridge arrangement similar to that shown in Fig. 2. The grid circuit and other usual parts of the amplifier are not illustrated. In this circuit the resistors R1 and R2 and the load 14 are the same as those shown in Fig. 2, the indicating lamp 12N together with the resistor 30 being merely shunted around the resistor R1 of Fig. 2. The lamp 12N, which, it is to be understood, gives a negative indication of the point of resonance, is utilized to give a general illumination to the tuning dial 31, being disposed between said dial and the panel 32 of the radio receiver. The dial is viewed through the window 33, and the receiver is tuned by means of the control knob 34 upon the shaft 35, by which are simultaneously actuated the tuning condensers (not shown) and the dial 31. Any appropriate gearing arrangement may be utilized between the knob 34 and/or the condensers and dial 31. The indicating lamp 12P gives a positive indication and is utilized to illuminate a small portion of the translucent dial 31, through a hole in the opaque shield 37, behind the opaque index mark 36. Alternatively, the hole in the opaque shield 37 may be cut in the form of an arrow head or the like, so that the light from lamp 12P shines through to form an index.

In operation, the dial 31 is generally illuminated by the indicating lamp 12N, and as the receiver is tuned by means of the control knob 34 to resonance with a broadcast signal, the illumination of the lamp 12N decreases and that of lamp 12P increases. Thus, the system comprises a plurality of light sources under control of the amplitude of the received signal as determined by the automatic volume control means for differentially energizing the sources, that is, for varying the illumination from one source in inverse ratio to the illumination from the other source. This causes the general illumination to fade and a spot on the dial, illuminating the index mark, to appear, and enabling the operator to determine the exact resonance setting of the receiver. In other words, the accuracy of tuning is indicated by a change in the ratio of the illuminated to comparatively non-illuminated areas of the dial, while the calibrations are maintained visibly illuminated.

Fig. 4 also illustrates a supplemental arrangement employing two different types of tuning indicators, namely, a meter, 12M, preferably a milliameter, which is connected in shunt with the indicator lamp 12N so as to give a minimum current indication when the selective circuits are tuned to resonance, and an indicator lamp 12'P which is connected in shunt with the indicator lamp 12P. The lamp 12'P is so placed as to illuminate the meter 12M. In operation as the receiver is tuned to resonance with any signal, the meter 12M will dip to indicate a minimum current and simultaneously the lamp 12'P will illuminate the dial of the meter with the maximum brilliance. The illumination of the dial of the meter 12M may be direct, as shown, or the dial may be made of translucent material, and the lamp 12N may be placed behind it, in which case the indications of the meter 12M may be observed by transmitted light. In either of these cases, the meter dial will serve to diffuse the light produced by the indicator lamp 12'P.

It is obvious that either or both of the two combinations of indicators just described, may be used.

Fig. 5 shows a general arrangement including a panel 32, tuning control knob 34, and control shaft 35 having mounted thereon the dial 31. The dial 31 is made of translucent material, and the indicating lamp 12 is arranged to generally illuminate it by means of transmitted light. The indicating lamp 12 may be connected as shown in either of Figs. 1 and 2 to give a negative or a positive indication, as desired.

In Fig. 6, in which similar parts are designated by the same reference characters, the lamp 12 is arranged between the dial 31 and the panel 32. The dial 31, which may in this instance be of opaque material, serves to reflect and diffuse the light produced by the indicator lamp 12. As in the other figures, it is viewed through the window 33; and the illumination thereon may be produced by a lamp 12 giving either positive or negative indications.

Fig. 7 is an arrangement similar to that shown in Fig. 4. However, either one of the lamps 12 may be connected to give a permanent illumination. The other lamp 12 may be connected in either the circuit shown in Fig. 1 or that shown in Fig. 2 to give negative or positive indications, respectively. In the former event, the lamp 12, giving the permanent illumination, may be a tungsten filament lamp connected, as described above, in shunt with the indicator lamp $12_N$ in place of the resistor 13 of Fig. 1.

Fig. 8 shows an arrangement which is similar to that of both Figs. 4 and 7, except that both of the indicator lamps, 12, are arranged behind the dial 31, which is of translucent material. The index mark 36 is arranged between the shield 37 and the dial 31. The illumination from one of the lamps 12 is through an opening in the shield 37, and that of the other lamp 12' is general. Either of the lamps, 12 or 12', may be connected to give a negative indication, although it is preferred that the one, 12' giving the general illumination be so connected. In this event, the other lamp may be connected to give a permanent illumination, or may be connected to give a positive indication. In either case, as the first lamp 12' goes out, indicating resonance, the remaining lamp, 12, will throw an illuminated spot upon the dial 31, silhouetting the index mark 36 and indicating the exact resonance setting of the receiver.

Another alternative arrangement is shown in Fig. 9, wherein an indicator lamp 12, which, for example, may give a negative indication, is arranged behind the shield 37, through a triangular aperture 37' of which it illuminates an area 37'' upon the translucent dial or screen 31. The front of the dial may be generally illuminated, as desired, in a manner similar to that in which the dial in Fig. 7 is illuminated by the lamp 12 arranged between the dial 31 and the panel 32. The index mark 36 is arranged between the dial and the window 33. As the receiver is tuned to resonance, the indicating lamp 12 will be "tuned out", which will cause the spot of light 37'' transmitted through the dial to disappear. The filament of the indicator lamp 12 may at this time produce light, but in just sufficient quantities so that the illumination of the spot 37'' will not be visible, due to the general illumination produced as by a general illuminating lamp or by means of the light transmitted through the window 33. It is to be understood that the exact setting of the dial under these circumstances is observed by this general illumination, the exact tuning being accomplished by the disappearance of the spot of light, 37''.

The center of the filament of the lamp 12 may be arranged level with the lower point of the triangular opening 37', which will cause the spot of light 37'' to appear to spread continuously from the lower point as the illumination increases, and thus in the event that the signal is received with below average intensity, so that the plate current of the controlled tubes is not minimum, the apparent size of the spot of illumination upon the dial or screen 31 will, however, be minimum when the set is tuned to resonance.

Still referring to the arrangement of Fig. 9, a further alternative adaptation of the invention includes the use of an indicator lamp 12, of the type giving a positive indication. In this event, if the center of the filament of lamp 12 is arranged level with the lower point of the triangular opening 37' in an opaque shield 37, the beam of light falling upon the translucent dial or screen 31 will illuminate a portion of the latter, which will apparently increase in area as the brilliance of the lamp 12 increases. The remainder of the dial or screen 31 will be in the shadow of the opaque shield 37. The area of the illuminated portion will thus appear to increase continuously to a maximum as the tuning of the receiver approaches resonance. If the lamp or light source is close to the screen, the same effect is produced without the interposition of the opaque shield 37. With such an arrangement, whether a negative or a positive indicating lamp is employed, it will be observed that the point of resonance is indicated by the magnitude and apparent ratio of the illuminated and comparatively nonilluminated areas of the indicating dial or screen 31.

In Fig. 10 an elongated column of translucent light-diffusing material, for example, an opal or colored glass rod 40, or the equivalent, is arranged with its end adjacent the indicating lamp 12 behind the panel 32 of a radio receiver. A shield $37_1$ is arranged to screen the rod to prevent the light from the indicating lamp 12 illuminating the rod except through the end which projects through a hole in the shield. The rod is observed through an elongated window 33', and when the lamp 12 is lighted, the rod will appear to be partly illuminated to a point, say 40'. Usually the rod 40 will be closer to the panel 32 than shown in Fig. 10, so that the rod appears to fill the entire window 33'. As the intensity of the light is decreased, the point 40' will fall; and as it is increased, it will rise, very much in the same way as the column of fluid in a thermometer acts under varying temperature conditions. The lamp 12 may be either a positive or a negative indicating lamp, and the tuning in either instance is accomplished by tuning until the point 40' either rises or falls, respectively, to the maximum extent.

The specific arrangement of the indicator lamp and dial, except for the requirement that means be provided to diffuse the light in order to make small changes in the illumination of the lamp more readily perceptible, may be varied, as desired, to suit other requirements without departing from the spirit of this invention. For instance, "full vision" stationary dials may be used, and the indicator lamps, index marks, and shield 37 may be rotated as the receiver is tuned.

Furthermore, a lamp or lamps connected as shown in any of the Figs. 1 to 4, inclusive, may be arranged behind a bull's-eye or bezel of any desired type for the purpose of merely indicating when the receiver is tuned to the point of resonance. Such an arrangement is applicable to a remote-control tuning system, for example, although the other schemes are likewise applicable. In this arrangement the usual dial light may be provided for illuminating the tuning dial. Generally, however, if the indicator lamp is to be observed not in connection with a light-diffusing tuning dial, some other means should be provided to diffuse the light in order to render more perceptible the small changes in the light produced thereby.

What is claimed is:

1. Radio receiving apparatus comprising, in combination, signal-selecting means tunable to receive any signal of specified frequency in a band of frequencies, signal-amplifying means connected to said selecting means, amplification control means for automatically controlling the amplification of said amplifying means inversely with the received signal intensity, incandescent indicating means connected in circuit with said amplifying means, whereby variations in the intensity of the signal impressed upon said amplifying means results in inverse variations in the light produced by said indicating means, means for maintaining said indicating means in a state of incipient incandescence, and light-diffusing means for rendering readily perceptible variations in illumination produced by small changes in the current through said indicating means, thus giving negative indications of the accuracy of tuning of said selecting means.

2. Radio receiving apparatus comprising, in combination, signal-selecting means tunable to receive any signal of specified frequency in a band of frequencies, signal-amplifying means adapted to amplify the signals thus received, incandescent indicating means connected to said amplifying means for producing variations in light with the average current flowing through said amplifying means, means for maintaining said indicating means in a state of incipient incandescence, and light-diffusing means for rendering readily perceptible variations in illumination produced by small variations in current through said amplifying means, indicative of small variations in the tuning of said selecting means.

3. Radio receiving apparatus comprising, in combination, signal-selecting means tunable to receive any signal of specified frequency in a band of frequencies, signal-amplifying means for amplifying the signals thus received, amplification control means for varying the amplification of said amplifying means inversely with the received signal strength, whereby substantially uniform signals are produced from received signals varying considerably in strength, incandescent indicating means connected to said amplifier so that the light produced thereby will vary inversely with the amount of amplification of said amplifier and directly with the received signal intensity and thereby give a positive indication of the accuracy of tuning as said selecting means is tuned to any signal, means for maintaining said indicating means in a state of incipient incandescence, and light-diffusing means for rendering readily perceptible small changes in the light produced by said indicating means.

4. Radio receiving apparatus comprising, in combination, signal-selecting means tunable to receive any signal of specified frequency in a given band of frequencies, amplifying means for amplifying the signals thus received, incandescent indicating means connected to said amplifying means, whereby variations in the average current passing through said amplifying means will cause an inverse variation in the light produced by said indicating means, and light-diffusing means for rendering readily perceptible small changes in the light produced by said indicating means, whereby there is produced a positive visual indication of small variations in the tuning of said signal-selecting means.

5. Radio receiving apparatus comprising, in combination, signal-selecting means tunable to receive any signal of specified frequency in a band of frequencies, signal-amplifying means for amplifying the signals thus received, incandescent indicating means connected to said amplifying means for producing variations in light in accordance with the average current flowing through said amplifying means, and light-diffusing means for rendering readily perceptible small variations in the light produced by said indicating means, indicative of small variations in the tuning of said selecting means.

6. Radio receiving apparatus comprising, in combination, signal selecting means tunable to receive any signal of specified frequency in a given band of frequencies, signal-amplifying means for amplifying the signals thus received, means for automatically controlling the amplification of said amplifying means, incandescent light-producing indicating means connected to said amplifying means, whereby variations in the amplification of said amplifying means, occasioned by variations in the tuning of said signal selecting means, effect continuous variations in the light produced by said indicating means, and light-diffusing means adapted to cooperate with said indicating means, whereby small changes in light, indicative of small changes of tuning, are made readily perceptible.

7. Radio receiving apparatus which comprises, in combination, signal-selecting means adapted to tune said apparatus to receive any signal of specified frequency in a band of frequencies, means for amplifying the signal thus received, means for automatically controlling the amplification by said amplifying means, incandescent indicating means connected to said amplifying means in such a manner as to produce variations of light with the tuning of said selecting means, and light-diffusing means so disposed as to be illuminated by said indicating means, whereby small changes in the light produced by said indicating means are rendered readily perceptible, said light-diffusing means comprising a tuning dial operatively related to said signal-selecting means to indicate the setting of said selecting means.

8. Radio receiving apparatus comprising, in combination, signal-selecting means tunable to receive any signal of specified frequency in a band of frequencies, signal-amplifying means for amplifying the signals thus received, amplification control means for varying the amplification of said amplifying means inversely with the received signal strength, whereby substantially uniform signals are produced from received signals varying considerably in strength, incandescent indicating means connected to said amplifier so that the light produced thereby will vary inversely with the amount of amplification of said amplifier and directly with the received signal intensity and thereby give a positive indication of the accuracy of tuning as said selecting means is tuned to any signal, and light-diffusing means for rendering readily perceptible small changes in the light produced by said indicating means.

9. Radio receiving apparatus comprising, in combination, signal-selecting means tunable to receive any signal of specified frequency in a given band of frequencies, signal-amplifying means for amplifying the signals thus received, automatic control means for varying the amplification of said amplifying means to produce signals of substantially uniform intensity despite considerable variation in the input intensity of the signals, incandescent indicating means connected with said amplifying means, whereby variations in the amplification of said amplifying means are inversely indicated by variations in the intensity of the light produced by said indicating means, and a light-diffusing dial operatively related to said signal-selecting means and so arranged as to be illuminated by said indicating means, whereby small changes in the light produced by said indicating means are rendered readily perceptible and there is thus produced a positive indication of variations in the received signal strength as occasioned by the tuning of said signal-selecting means.

10. Radio receiving apparatus comprising, in combination, signal-selecting means tunable to receive any signal of specified frequency within a band of frequencies, signal-amplifying means for amplifying the signals thus received, automatic amplification-control means for varying the amplification of said amplifying means to permit a substantially uniform reproduction of signals regardless of their received strength, incandescent indicating means connected to said amplifying means for producing a light varying in intensity with the amplification of said amplifying means, means for maintaining said indicating means in a state of incipient incandescence, and light-diffusing means for diffusing the light produced by said indicating means to render readily perceptible light variations produced by small variations in the average current passing through said amplifying means, whereby there is produced an indication of the tuning of said signal-selecting means.

11. Radio receiving apparatus comprising, in combination, signal-responsive means tunable to receive any signal of specified frequency in a given band of frequencies, signal-amplifying means for amplifying the signals thus received, means for automatically controlling the amplification of said last-mentioned means, two light-producing indicating means in circuit with said amplifying means, whereby variations in the amplification of said means, occasioned by variations in the tuning of said signal-responsive means, produce direct and inverse variations, respectively, in the light emitted by said two indicating means, and a light-diffusing tuning dial operatively related to said tunable signal-responsive means and being illuminated by each of said light-producing indicating means.

12. In combination with a radio receiver having automatic volume control, a tuning-indicator lamp so connected in circuit with said receiver as to give a certain indication of the tuning of said receiver, a light-diffusing tuning dial, said indicator lamp being mounted in such a position that rays therefrom pass through a small portion of said indicator dial to indicate the exact tuning of said receiver, and a second tuning indicator lamp so connected in circuit with said receiver as to give a certain but opposite indication of the tuning of said receiver, said second indicating lamp being so disposed as to give a general illumination to said tuning dial.

13. In combination with a radio receiver having automatic volume control, a tuning-indicator lamp so connected in circuit with said receiver as to give a positive indication of the tuning of said receiver, a light-diffusing tuning dial, said indicator lamp being mounted in a position such that rays therefrom illuminate a small portion of said dial to indicate the exact tuning of said receiver, and a second tuning-indicator lamp so connected in circuit with said receiver as to give a negative indication of the tuning of said receiver, said second indicating lamp being so disposed as to give a general illumination to said tuning dial.

14. In a radio responsive device, a circuit tunable to respond to any frequency in a band of frequencies, a lamp connected to said circuit to give an indication of the tuning of said circuit to resonance with any radio-frequency current impressed thereon, and diffusing means for rendering readily perceptible small changes in the current through said lamp, said diffusing means comprising a rod of translucent material disposed with one end thereof adjacent said lamp, whereby variations in tuning are indicated by variations in the ratio of apparently illuminated to apparently non-illuminated portions of said rod.

15. In a tunable radio receiver having automatic volume control, a translucent light-diffusing screen, an incandescent lamp positioned behind said screen for illuminating at least a portion of said screen, and means for automatically changing continuously the apparent ratio of illuminated to comparatively non-illuminated areas of said screen to indicate continuously variations in tuning of said receiver.

16. In a tunable radio receiver having automatic volume control, a calibrated tuning dial comprising a light-diffusing screen, a source of light of constant area and continuously variable intensity for illuminating at least a portion of said screen, and means for automatically varying the intensity of the light from said source to change continuously the apparent ratio of the areas of the illuminated to comparatively non-illuminated portions of said screen to indicate continuously variations in tuning of said receiver while maintaining the calibrations on said dial visibly illuminated.

17. An indicating device comprising an elongated column of translucent material and means for illuminating an end surface of said column with variable intensity of illumination, said column comprising means the visibility of which is dependent upon said intensity of illumination.

18. An indicating device comprising an elongated rod of translucent light-diffusing glass and a source of illumination of variable intensity disposed adjacent one end of said rod, whereby the extent of apparent illumination of said rod is dependent upon said intensity.

19. An illuminating device comprising an elongated column of solid light-transmitting material and a source of illumination disposed adjacent one end of said column the illumination of which is confined substantially to said end and is of such intensity as to be capable of illuminating the entire length of said column.

20. In a radio receiver, automatic volume control means, a plurality of light sources, and means under the control of said automatic volume control means for differentially so energizing said sources that as the intensity of illumination from one source is increased, that from the other is diminished.

21. In a radio receiver, a plurality of light sources, a tuning indication device adapted to be illuminated by said light sources, means for differentiating between the illuminations from two of said light sources respectively, and means controlled by an incoming signal for varying the intensity of illumination from one of said light sources in inverse ratio to that from another of said light sources.

HAROLD A. WHEELER.